US010752257B2

(12) United States Patent
Durney et al.

(10) Patent No.: US 10,752,257 B2
(45) Date of Patent: Aug. 25, 2020

(54) CAR OPERATING SYSTEM THAT CONTROLS THE CAR'S DIRECTION AND SPEED

(71) Applicant: A Truly Electric Car Company, Millbrae, CA (US)

(72) Inventors: Edward Gordon Durney, Millbrae, CA (US); Brian Durney, Santaquin, UT (US)

(*) Notice: Subject to any disclaimer, the term of this patent is extended or adjusted under 35 U.S.C. 154(b) by 0 days.

(21) Appl. No.: 15/049,004

(22) Filed: Feb. 19, 2016

(65) Prior Publication Data

US 2016/0214622 A1    Jul. 28, 2016

(51) Int. Cl.
| | |
|---|---|
| *B60W 50/10* | (2012.01) |
| *G05D 1/02* | (2020.01) |
| *B60W 50/00* | (2006.01) |
| *G06F 9/455* | (2018.01) |
| *B60R 16/023* | (2006.01) |
| *B60N 2/02* | (2006.01) |
| *G07C 5/02* | (2006.01) |

(Continued)

(52) U.S. Cl.
CPC ........ *B60W 50/10* (2013.01); *B60W 50/0098* (2013.01); *G05D 1/021* (2013.01);
(Continued)

(58) Field of Classification Search
CPC .... B60W 50/10; B60W 10/08; B60W 10/184; B60W 30/02; B60W 30/18; B60W 10/04;
(Continued)

(56) References Cited

U.S. PATENT DOCUMENTS

| 3,944,972 A | * | 3/1976 | Chandler | ............... B60Q 9/002 |
| | | | | 340/425.5 |
| 6,230,138 B1 | * | 5/2001 | Everhart | ................. G10L 15/26 |
| | | | | 454/74 |

(Continued)

OTHER PUBLICATIONS

Rick Demeis, "Teardown reveals Chevy Volt's electronic secrets", EDN Network, May 10, 2012, http://www.edn.com/design/automotive/4372600/Teardown-reveals-Chevy-Volt-s-electronic-secrets, 8 pages, downloaded on Mar. 5, 2016.

(Continued)

*Primary Examiner* — Behrang Badii
(74) *Attorney, Agent, or Firm* — Patent Strategies; Edward Dumey

(57) ABSTRACT

Our car operating system allows a car's driver to control—using abstract direction and speed commands—the car's devices that make the car move. The car operating system uses information like the current state of the car's devices to process those high-level abstract commands and generate device-specific commands at a lower level of abstraction to send to the car devices that will implement the driver's commands. The car operating system sits between the driver of the car (which may be a human or an automated driving program) and the car's devices, much like a computer operating system sits between the user of a computer (which may be a human or an application program) and the computer's devices. The car operating system performs two functions: (1) Provides an abstract machine that allows the car's driver to use more powerful abstract commands rather than more primitive device-level commands. (2) Manages the car's resources so that the car's driver does not have to control each device directly.

10 Claims, 16 Drawing Sheets

THE FLOW OF CONTROL FROM THE DRIVER TO THE CAR DEVICES

(51) Int. Cl.
*G05D 1/00* (2006.01)
*B60W 30/00* (2006.01)

(52) U.S. Cl.
CPC ........ *G06F 9/45504* (2013.01); *B60N 2/0244* (2013.01); *B60R 16/0231* (2013.01); *B60W 30/00* (2013.01); *B60W 2050/0006* (2013.01); *B60W 2050/0018* (2013.01); *B60W 2540/21* (2020.02); *B60W 2540/215* (2020.02); *G05D 1/00* (2013.01); *G05D 1/02* (2013.01); *G05D 1/0257* (2013.01); *G07C 5/02* (2013.01)

(58) Field of Classification Search
CPC ............ B60W 10/18; B60W 50/0098; B60W 2540/215; B60W 2540/21; B60W 2050/0006; B60W 2050/0018; B60W 50/085; B60W 40/08; B60W 30/00; B60R 16/0231; B60R 25/00; G05D 1/021; G05D 1/02; G05D 1/0223; G05D 1/00; G05D 1/0278; G05D 1/0295; G05D 1/0257; G05D 1/0246; G05D 1/0274; G05D 1/024; G05D 1/0248; G05D 1/0214; G05D 1/0027; G05D 1/0088; G05D 1/0022; G05D 1/0276; G05D 1/0016; G05D 23/1917; G08G 1/16; G08G 1/005; G08G 1/165; G08G 1/166; G08G 1/202; G08G 21/06; G08G 1/01; G08G 1/07; G08G 1/164; G08G 5/37; B60L 11/1877; B60L 15/2054; B60L 15/007; B60L 11/18; B60L 3/12; B60K 17/356; B60K 17/30; B60K 17/10; B60K 31/0008; B60K 31/00; G01S 19/07; G01S 19/41; G01S 13/931; G01S 13/00; G01S 13/93; G01S 17/023; G01S 7/4972; G01S 79/936; G01S 17/87; B62B 5/0026; B62D 51/04; B62D 7/08; B62D 7/09; B62D 9/00; B62D 11/02; B62D 11/24; B62D 11/006; B62D 31/003; B62D 33/02; B62D 51/001; B62D 51/02; B62D 11/18; B62D 11/183; B62D 11/00; B62D 11/06; H04W 4/027; H04W 76/19; H04W 4/70; H04W 4/40; H04W 36/34; B60T 7/22; H04L 67/12; H04L 67/10; H04L 41/0816; H04L 63/102; H04L 67/306; B60Q 1/50; G06Q 10/00; G06Q 30/0645; G06N 7/005; G06N 20/00; G06K 9/4642; G06K 9/00228; G06K 9/00355; G06K 9/00604; G06K 9/00845; A61B 5/18; A61B 5/4809; A61B 5/0077; A61B 5/742; A61B 5/7405; G08B 21/06; G06F 3/04883; G06F 9/45504; G06F 21/32; G06F 3/04842; G06F 3/0622; G06F 3/0482; G06F 3/0637; G06F 3/013; G06F 16/583; G07C 5/02; G01C 21/365; G01C 21/83697; H04N 21/43637; H04N 21/64322; H04N 21/6408; H04N 21/41422; H04N 21/2265; H04N 24/43615; H04N 21/454

See application file for complete search history.

(56) References Cited

U.S. PATENT DOCUMENTS

| | | | |
|---|---|---|---|
| 6,240,347 B1 * | 5/2001 | Everhart | B60K 35/00 367/197 |
| 6,411,934 B1 * | 6/2002 | Moller | B60K 35/00 345/161 |
| 6,420,975 B1 * | 7/2002 | DeLine | B60R 1/12 340/425.5 |
| 6,714,846 B2 * | 3/2004 | Trsar | G07C 5/085 701/29.1 |
| 6,885,920 B2 | 4/2005 | Yakes | |
| 7,423,393 B2 | 9/2008 | Wakao et al. | |
| 7,895,135 B2 | 2/2011 | Norris | |
| 8,311,727 B2 | 11/2012 | Eckstein | |
| 8,381,849 B2 | 2/2013 | Sastry | |
| 8,400,287 B2 | 3/2013 | Visconti | |
| 8,401,737 B2 | 3/2013 | Aso | |
| 8,428,843 B2 | 4/2013 | Lee | |
| 8,528,680 B2 | 9/2013 | Florus | |
| 8,612,100 B2 | 12/2013 | Goy | |
| 8,838,308 B2 | 9/2014 | Meyers | |
| 9,254,877 B2 | 2/2016 | Ferren | |
| 9,632,502 B1 * | 4/2017 | Levinson | G05D 1/0027 |
| 2001/0018639 A1 * | 8/2001 | Bunn | G07B 15/00 701/482 |
| 2003/0030411 A1 | 2/2003 | Ayano | |
| 2005/0023049 A1 * | 2/2005 | Ferree | B60K 17/10 180/6.3 |
| 2005/0085984 A1 * | 4/2005 | Uhler | G01S 13/931 701/70 |
| 2006/0022842 A1 * | 2/2006 | Zoladek | G07C 5/008 340/870.07 |
| 2006/0155547 A1 * | 7/2006 | Browne | G10L 15/26 704/275 |
| 2009/0240408 A1 * | 9/2009 | Wolfgang | B60W 10/11 701/55 |
| 2009/0241708 A1 * | 10/2009 | Schaedler | B60K 17/10 74/388 PS |
| 2009/0242284 A1 * | 10/2009 | Whetstone, Jr. | B62B 5/0026 180/19.2 |
| 2009/0309970 A1 * | 12/2009 | Ishii | B60R 1/00 348/143 |
| 2010/0106356 A1 * | 4/2010 | Trepagnier | G05D 1/0248 701/25 |
| 2010/0217462 A1 | 8/2010 | Shaffer | |
| 2011/0251748 A1 * | 10/2011 | Moran | B60T 8/1755 701/31.4 |
| 2011/0251784 A1 | 10/2011 | Eckstein | |
| 2012/0330484 A1 | 12/2012 | Martin et al. | |
| 2013/0116908 A1 * | 5/2013 | Oh | G01S 19/07 701/96 |
| 2013/0249277 A1 | 9/2013 | Park | |
| 2014/0309864 A1 * | 10/2014 | Ricci | B60N 2/0244 701/36 |
| 2014/0309874 A1 * | 10/2014 | Ricci | G06F 21/31 701/36 |
| 2015/0175005 A1 | 6/2015 | Wilding | |
| 2015/0260143 A1 * | 9/2015 | Yorke | F02N 11/0822 701/112 |
| 2016/0070527 A1 * | 3/2016 | Ricci | G06F 3/165 715/716 |
| 2016/0231746 A1 * | 8/2016 | Hazelton | G01S 13/867 |
| 2016/0251828 A1 * | 9/2016 | Miyamoto | E02F 9/2079 701/22 |
| 2017/0106865 A1 * | 4/2017 | Lavoie | B62D 15/027 |
| 2017/0124407 A1 * | 5/2017 | Micks | G06K 9/4642 |
| 2017/0232848 A1 * | 8/2017 | Lian | B60L 3/102 701/22 |
| 2017/0242487 A1 * | 8/2017 | Naboulsi | B60R 11/0264 |
| 2017/0364084 A1 * | 12/2017 | Sakima | G05D 1/0223 |

OTHER PUBLICATIONS

Miad Faezipour et al., "Progress and Challenges in Intelligent Vehicle Area Networks", Communications of the ACM, Feb. 2012, pp. 91-100, vol. 55, No. 2.

Ryan Benesky, "Car Operating Systems", date unknown, http://www.docfoc.com/car-operating-systems-ryan-benesky-the-beginning-of-car-computers-1970s-was, 31 pages, downloaded on Mar. 5, 2016.

(56) References Cited

OTHER PUBLICATIONS

Protean Electric, "Control Systems", date unknown, http://www.proteanelectric.com/en/subsystems/, 3 pages, downloaded on Jan. 19, 2015.

Linux Foundation, "Automotive Grade Linux Requirements Specification", May 28, 2015, https://www.automotivelinux.org/software/agl-specifcation, 159 pages, downloaded on Nov. 13, 2017.

Majeed Ahmad, "Automotive Grade Linux Moving Beyond Infotainment with a Hypervisor Architecture", Embedded Computing Design, Aug. 17, 2017, http://www.embedded-computing.com/automotive/automotive-grade-linux-moving-beyond-infotainment-with-a-hypervisor-architecture, 3 pages, downloaded on Nov. 13, 2017.

Blackberry QNX, "Product Brief: QNX Neutrino Realtime Operating System", date unknown, 4 pages, downloaded from http://blackberry.qnx.com/en/products/neutrino-rtos/neutrino-rtos by selecting under the "Supporting Resources" category "Product Brief" on Nov. 13, 2017.

Microsoft Corporation, "Windows Embedded Automotive 7", date unknown, 2 pages, downloaded from https://www.microsoft.com/windowsembedded/en-us/windows-embedded-automotive-7.aspx by selecting "Download the datasheet" on Nov. 13, 2017.

Microsoft Corporation, "A Technical Companion to Windows Embedded Automotive 7", Jul. 2010, 100 pages, downloaded from https://www.microsoft.com/windowsembedded/en-us/windows-embedded-automotive-7.aspx by selecting "White paper: Technical Companion" on Nov. 13, 2017.

\* cited by examiner

PRIOR ART

A NEW YORKER CARTOON SHOWING HOW A DRIVER MIGHT
CONTROL A CAR USING AN ABSTRACT COMMAND

Smarter business for a Smarter Planet:

How to build a car fueled by software.

When you look at the Chevrolet Volt, are you looking at steel and plastic, or are you looking at software? The Volt, an electric car with gas-powered extended range, contains over 10 million lines of code, more software than you'd find in the avionics and navigation systems of a modern fighter jet. Chevrolet turned to IBM to help them design the control systems and software for the Volt, allowing them to deliver this revolutionary car in far less time than development typically takes. Using the Rational* platform to design the car allowed engineers around the world to collaborate in real time, which helped the Volt become the 2011 *Motor Trend* Car of the Year.* A smarter business is built on smarter software, systems and services.

Let's build a smarter planet. ibm.com/collaborate

PRIOR ART

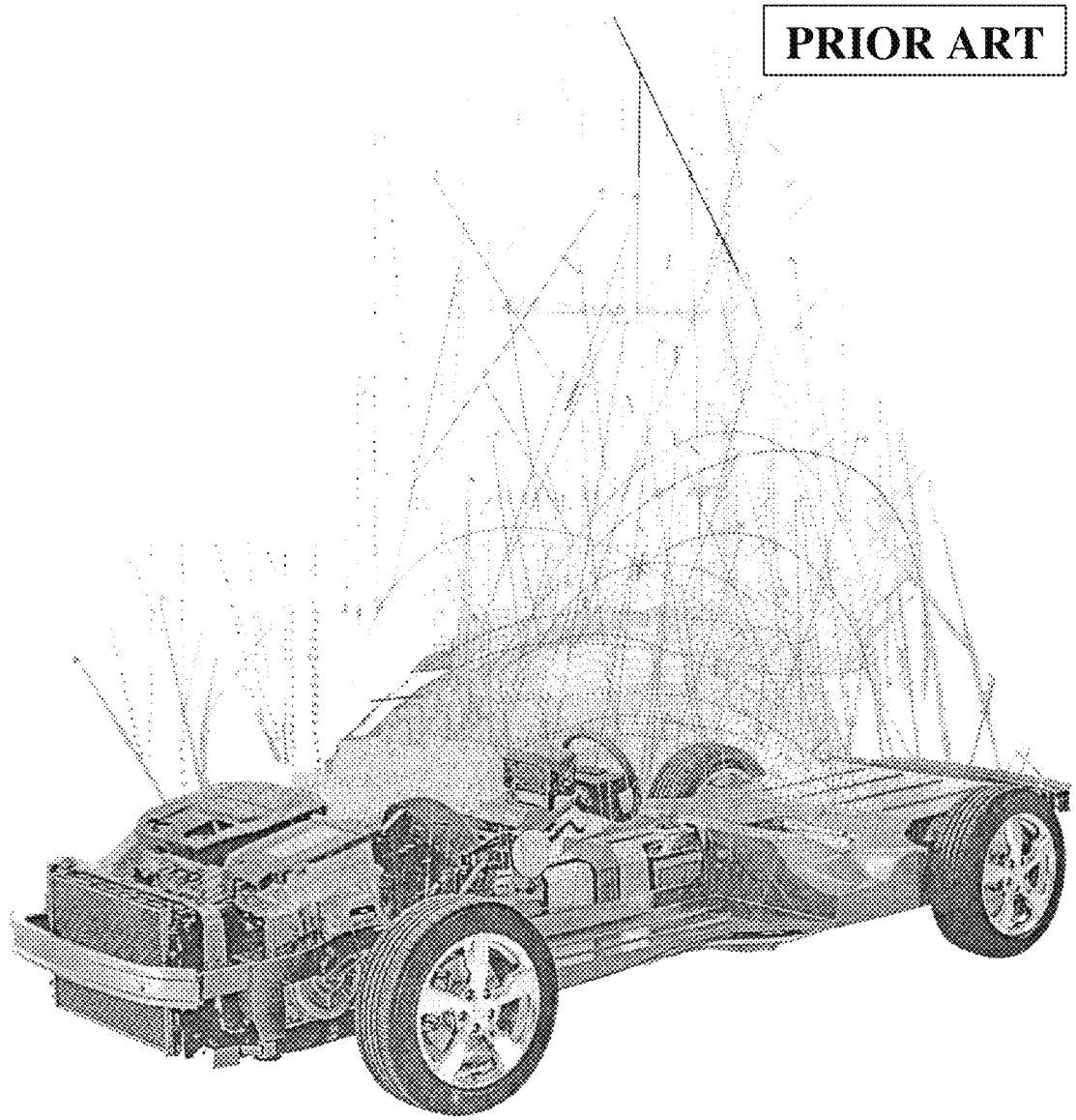

FIGURE 2
ADVERTISING FOR THE CHEVY VOLT

ADDING A DEVICE TO A COMPUTER

HARD-WIRED AND HARD-CODED COMPUTER (NO OPERATING SYSTEM)

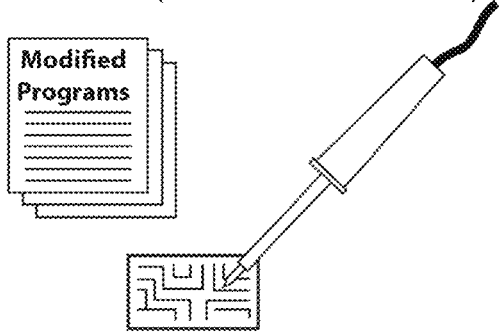

Adding a device (like a printer, disk, or keyboard) requires soldering connections and modifying every program that uses the new device.

COMPUTER WITH OS AND USB CONNECTIONS

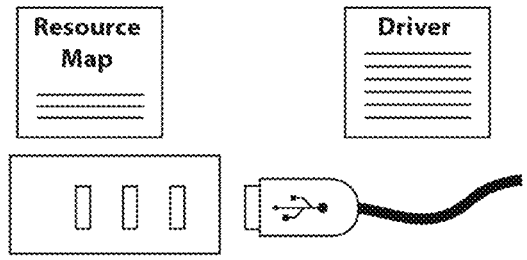

When a device is added, the operating system requires a driver to be installed and then adds the device to its resource map.

Application programs use abstract commands to access the device and don't require any changes.

ADDING A DEVICE TO A CAR

HARD-WIRED DRIVE-BY-WIRE CAR (NO CAR OS)

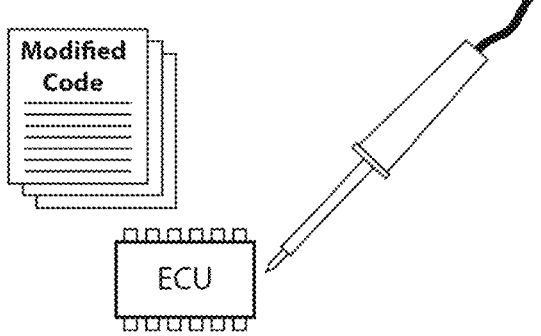

Adding a new device (anti-lock brakes) requires soldering connections and requires modification of all electronic control unit (ECU) programs and connections related to the brakes. No other ECUs can interact with the brake ECU unless their programs and/or electrical and mechanical connections are modified.

CAR WITH CAR OS AND MODULAR COMPONENTS

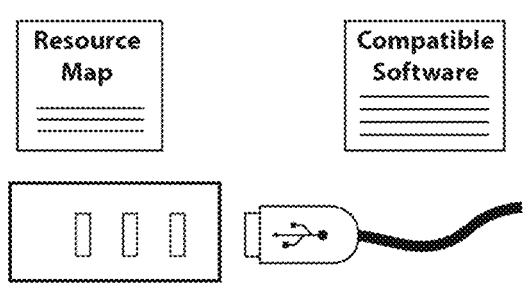

The car OS requires devices to have software that implements well-defined interfaces, but it can work with any devices that satisfy those requirements.

The car OS adds the new new device to its resource map. Software in any module can access the device via abstract commands, so braking can be coordinated with lights, throttle, steering, horn, etc.

FIGURE 3

THE DEVICE-SPECIFIC COMMAND IS AT A LOWER LEVEL
OF ABSTRACTION THAN THE DRIVER'S COMMAND

| DEVICE | DEVICE NAME | VALUE | ABSTRACT COMMAND | SPECIFIC COMMAND |
|---|---|---|---|---|
| TURN SIGNAL | TURN_SIGNAL | OFF | PRESS LEFT TURN SIGNAL | VALUE = LEFT |
| MOTOR L | MOTOR_LEFT | 0 | PRESS ACCELERATOR PEDAL | FL<0x78> |

FIGURE 5

AN EXAMPLE OF A PARTIAL CAR RESOURCE MAP

| DEVICE | DEVICE NAME | VALUE | ABSTRACT COMMAND | SPECIFIC COMMAND |
|---|---|---|---|---|
| TURN SIGNAL | TURN_SIGNAL | OFF | PRESS LEFT TURN SIGNAL | VALUE = LEFT |
| MOTOR L | MOTOR_LEFT | 0 | PRESS ACCELERATOR PEDAL | FL<0x78> |
| HAZARD LIGHTS | HAZARD_LIGHTS | OFF | ACTUATE HAZARD LIGHTS SWITCH | VALUE = ON |

FIGURE 6

AN EXAMPLE CHART SHOWING MAINTAINING A CAR RESOURCE MAP

THE HAZARD LIGHTS (WHICH WERE NOT PREVIOUSLY DEVICES ON THE CAR) WERE INSTALLED ON THE CAR AND THEREFORE ADDED TO THE CAR RESOURCE MAP

THE FLOW OF CONTROL FROM THE DRIVER TO THE CAR DEVICES

TODAY'S CARS:

STEERING COMMAND IS HANDLED BY HARDWARE, WHICH MECHANICALLY LINKS THE STEERING WHEEL WITH EACH WHEEL, SO THAT THE COMMAND NEVER LEAVES THE CONCRETE WORLD

OUR CAR:

STEERING COMMAND ENTERS THE ABSTRACT WORLD FOR HANDLING, THEN RETURNS TO THE CONCRETE WORLD AT A LOWER LEVEL OF ABSTRACTION TO BE FURTHER HANDLED BY HARDWARE

1960s CAR

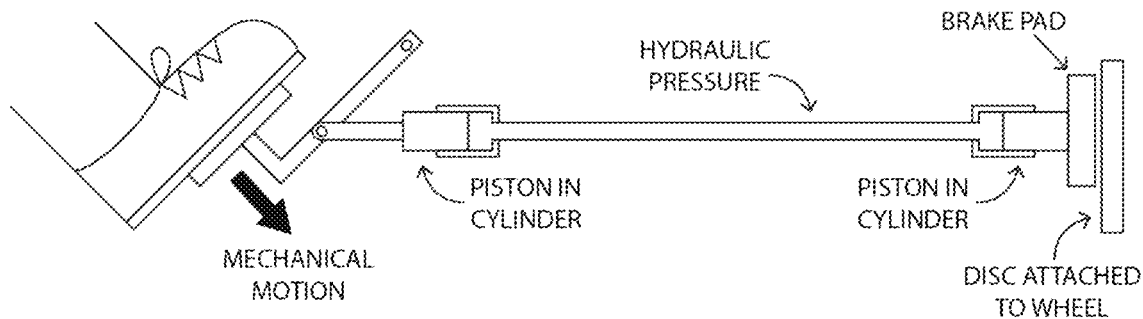

Interfaces are defined in terms of specific mechanical connections and hydraulic pistons and lines of specific sizes and pressures. Each part can only be replaced with another part of the same size and functionality.

CAR WITH ECU FOR ANTI-LOCK BRAKES

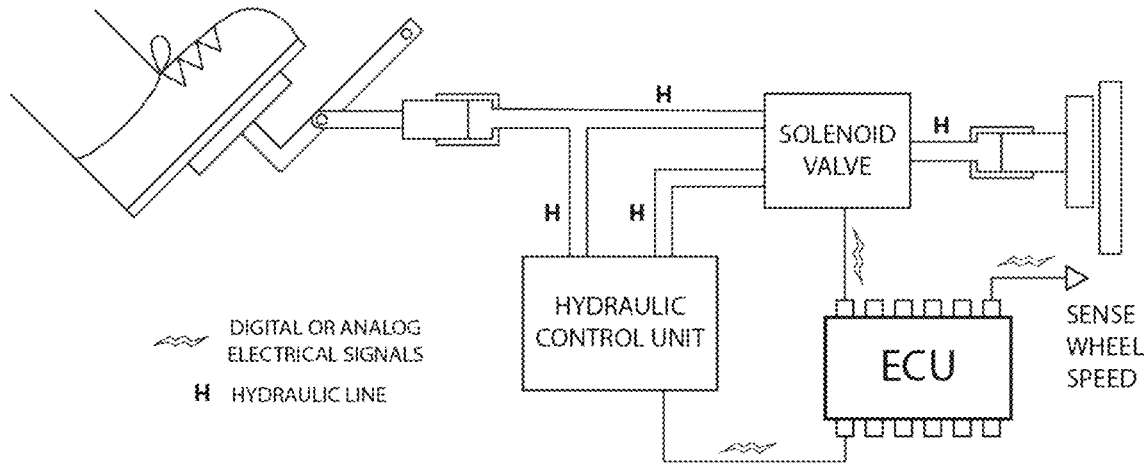

This braking system includes an electronic control unit (ECU) for anti-lock brakes. The ECU uses analog or digital electrical signals to control the hydraulic control unit and solenoid valves, and to receive data from a device that senses the rotational speed of the wheel. Because the electric signals are specific to a particular ECU and the device with which it communicates, the ECU can only provide one service (anti-lock braking), and it can only work the devices for which it was originally designed.

FIGURE 9A

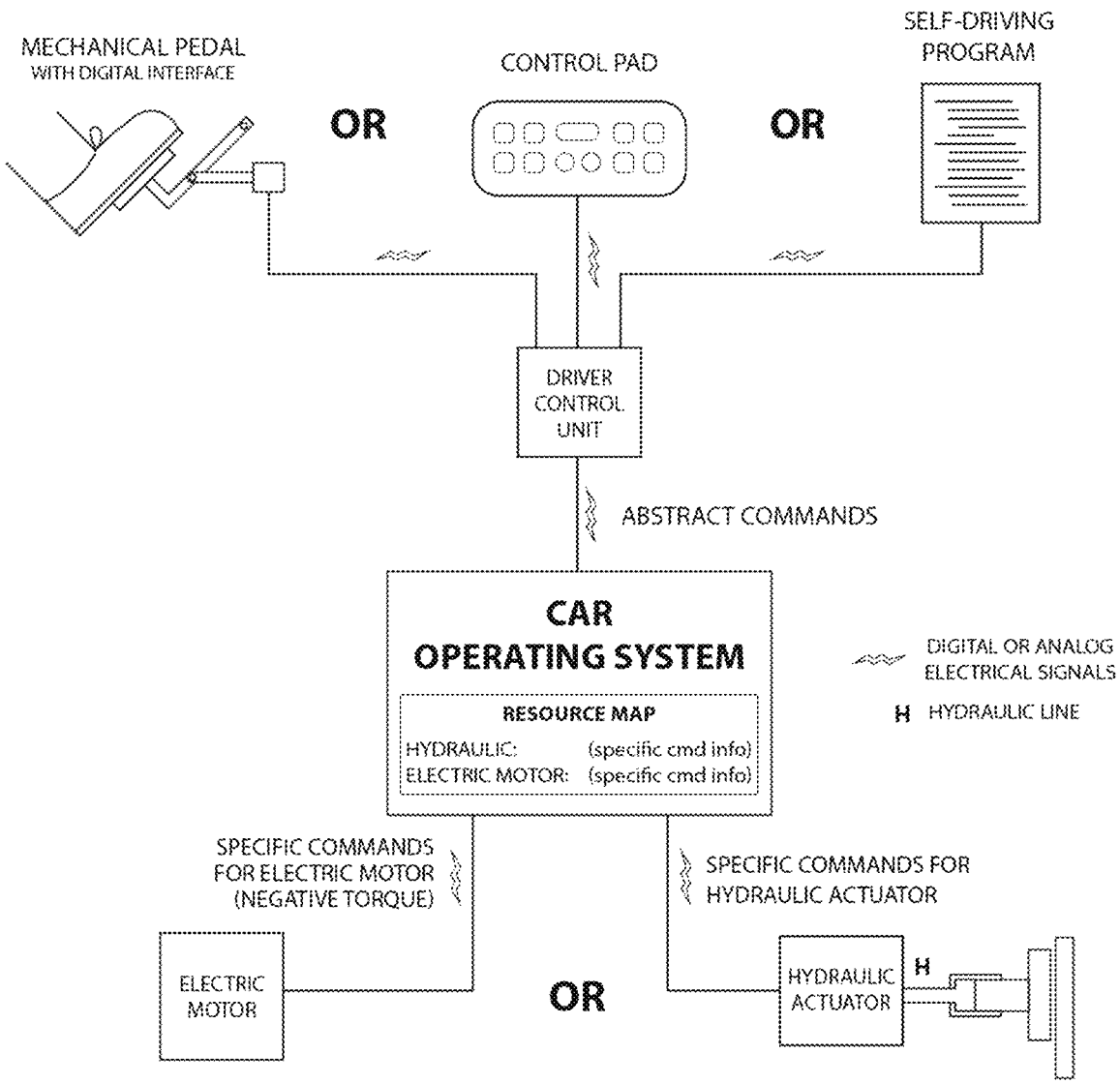

The car operating system can receive abstract commands from many kinds of devices and use its resource map to send specific commands to devices. This diagram shows several possibilities for a driver control unit receiving braking commands from a driver and sending abstract commands to the car OS The car OS consults its resource map and sends appropriate specific commands to the appropriate devices. Unlike the 1960s car or a prior-art ECU, the car OS can work with any devices that implement well-defined interfaces.

FIGURE 9B

DATA INTERFACE:

<Car Operating System>----<Driver Control Unit>

Form of Communications:
- Communication between the Driver Control Unit (DCU) and Car Operating System (COS) uses TCP sockets on port 9113 with the COS acting as server and the DCU as client.
- Communication is event-based, meaning that messages are sent when something changes rather than at regular intervals.
- Messages are sequences of 8-bit characters.
- Each message has a command followed by a value (optional). The delimiter for the command string is [0x03] and the delimiter for the value string (and for the entire message) is [0x04].

Form of Commands:
- Each command has three forms:
    1) a normal form that specifies a value for a state variable
    2) a _STATUS form used to report values back to the DCU as confirmation or in response to a query
    3) a _QUERY form used by the DCU to find out the current value of a state variable
- All letters in command names and values are upper case.
- Underscores separate words.
- Numbers are sequences of ASCII/Unicode characters. There are no leading zeros, so a one will be 1, a ten will be 10, and one hundred will be 100.
- The only numbers are integers.

Implemented Commands:
- Normal form of commands (each command name corresponds to the name of a state variable):
    FORWARD <number in range 0 to 255 with 0 for no throttle, 255 for full throttle>
    REVERSE <number in range 0 to 255 with 0 for no throttle, 255 for full throttle>
    STEERING <number in range -127 to 128 with -127 for full left and 128 for full right>
    BRAKES <number in range 0 to 255 with 0 for no braking and 255 for full braking>
    HEADLIGHTS OFF (no light) LOW_BEAM (normal low-beam headlights) HIGH_BEAM (high-beam headlights)
    TURN_SIGNAL OFF LEFT RIGHT
    REVERSE_LIGHTS OFF ON
    BRAKE_LIGHTS OFF ON
    WIPERS_FRONT OFF ON INT1 INT2 ... INT6 (for intermittent or intervals, with INT1 being the longest time with the wipers off and INT6 with the shortest time with wipers off) REGULAR FAST
    WIPERS_BACK same values as WIPERS_FRONT
    WASHER_FRONT OFF ON
    WASHER_BACK OFF ON
    HORN OFF ON
    HAZARD_LIGHTS OFF ON

FIGURE 10A
CAR OPERATING SYSTEM
DATA INTERFACE SPECIFICATIONS

Notes on Commands:

- The DCU must make sure that the reverse lights and brake lights are turned on when the driver puts the car in reverse or brakes.
- The DCU must blink the turn signals and hazard lights on and off by sending on and off signals to the COS.

Sample Sequences:

- Driver brakes
  *DCU to COS:* FORWARD[0x03]25[0x04]
  *COS to DCU:* FORWARD_STATUS[0x03]25[0x04]
  *DCU to COS:* BRAKES[0x03]100[0x04]
  *COS to DCU:* BRAKES_STATUS[0x03]100[0x04]
  *DCU to COS:* BRAKE_LIGHTS[0x03]ON[0x04]
  *COS to DCU:* BRAKE_LIGHTS_STATUS[0x03]ON[0x04]

- Driver releases brakes
  *DCU to COS:* BRAKES[0x03]0[0x04]
  *COS to DCU:* BRAKES_STATUS[0x03]0[0x04]
  *DCU to COS:* BRAKE_LIGHTS[0x03]OFF[0x04]
  *COS to DCU:* BRAKE_LIGHTS_STATUS[0x03]OFF[0x04]

- DCU is updating driver display:
  *DCU to COS:* HEADLIGHTS_QUERY[0x03][0x04]
  *COS to DCU:* HEADLIGHTS_STATUS[0x03]OFF[0x04]
  *DCU to COS:* WIPERS_FRONT_QUERY[0x03][0x04]
  *COS to DCU:* WIPERS_FRONT_STATUS[0x03]INT3[0x04]
  *DCU to COS:* WIPERS_BACK_QUERY[0x03][0x04]
  *COS to DCU:* WIPERS_BACK_STATUS[0x03]INT1[0x04]

FIGURE 10B
NOTES ON
CAR OPERATING SYSTEM
DATA INTERFACE SPECIFICATIONS

DATA INTERFACE:
        <Car Operating System>----<Motor Controller>

Form of Communications:
- Communication between the Car Operating System (COS) and the Motor Controller (MC) uses USB serial communication through a serial port, such as COM5 (Windows) or /dev/TTYACM0.
- Communication is event-based, meaning that messages are sent when something changes rather than at regular intervals.
- Messages are two bytes (16 bits) long.
- The command usually applies only to one motor controller, although it can be used for more than one motor controller if desired.

Notes on Communications:
- Messages should be sent in two-byte chunks so that they do not clump together. Otherwise, some messages may become mixed up in order and ignored.

Form of Commands:
- Each command is two bytes in the form of:
  1) one-byte ASCII/Unicode character that tells what the command is
  2) one-byte integer that gives the data associated with the command

Implemented Commands:
- Normal form of commands:
  F (for forward) <number in range 0 to 255 with 0 for no throttle and 255 for full throttle>
  R (for reverse) <number in range 0 to 255 with 0 for no throttle and 255 for full throttle>

Sample Command Sequences:
- Make wheel go forward at full throttle
  *COS to MC:* F[0xFF]
- Make wheel go forward at half throttle
  *COS to MC:* F[0x7F]
- Make wheel go backward at full throttle
  *COS to MC:* R[0xFF]
- Make wheel coast
  *COS to MC:* R[0x00]

FIGURE 11
MOTOR CONTROLLER
DATA INTERFACE SPECIFICATIONS

DATA INTERFACE:
    <Car Operating System>----<Wheel/Motor Module>

Form of Communications:
- Communication between the Car Operating System (COS) and the Wheel/Motor Module (WMM) uses USB serial communication through a serial port, such as COM5 (Windows) or /dev/TTYACM0.
- Communication is event-based, meaning that messages are sent when something changes rather than at regular intervals.
- Messages are two bytes (16 bits) long.
- The command usually applies only to one wheel/motor module, although it can be used for more than one wheel/motor module if desired.

Notes on Communications:
- Messages should be sent in two-byte chunks so that they do not clump together. Otherwise, some messages may become mixed up in order and ignored.

Form of Commands:
- Each command is two bytes in the form of:
    1) one-byte ASCII/Unicode character that tells what the command is
    2) one-byte integer that gives the data associated with the command Implemented Commands:
- Normal form of commands:
    S (for steering) <number in range -127 to 128 with -127 for full left and 128 for full right>
    B (for brakes) <number in range 0 to 255 with 0 for no braking and 255 for full braking>

Sample Command Sequences:
- Make wheel turn full left
    *COS to WMM:* S[0xFF]
- Make wheel turn straight ahead
    *COS to WMM:* S[0x00]
- Make wheel turn full right
    *COS to WMM:* S[0x7F]
- Make brake full off
    *COS to WMM:* B[0x00]
- Make brake half on
    *COS to WMM:* B[0x7F]

FIGURE 12
WHEEL/MOTOR MODULE
DATA INTERFACE SPECIFICATIONS

DATA INTERFACE:
    <Car Operating System>----<Body Module>

Form of Communications:
- Communication between the Car Operating System (COS) and the Body Module (BM) uses USB serial communication through a serial port, such as COM5 (Windows) or /dev/TTYACM0.
- Communication is event-based, meaning that messages are sent when something changes rather than at regular intervals.
- Messages are two bytes (16 bits) long.

Notes on Communications:
- Messages should be sent in two-byte chunks so that they do not clump together. Otherwise, some messages may become mixed up in order and ignored.

Form of Commands:
- Each command is two bytes in the form of:
  1) one-byte ASCII/Unicode character that tells what the command is
  2) one-byte integer that gives the data associated with the command Implemented Commands:
- Normal form of commands:
  H (for headlights) <0 (no light); 1 (low-beam headlights); 2 (high beam headlights)>
  T (for turn signal) <0 (off); 1 (left); 2 (right)>
  V (for reverse lights) <0 (off); 1 (on)>
  K (for brake lights) <0 (off); 1 (on)>
  W (for front wipers) <0 (off); 1 (int1 – longest delay); 2 (int2); 3 (int3); 4 (int4); 5 (int5); 6 (int6 – shortest delay); 7 (regular speed); 8 (fast speed)>
  U (for back wipers) <0 (off); 1 (int1 – longest delay); 2 (int2); 3 (int3); 4 (int4); 5 (int5); 6 (int6 – shortest delay); 7 (regular speed); 8 (fast speed)>
  C (for front washer) <0 (off); 1 (on)>
  Y (for rear washer) <0 (off); 1 (on)>
  N (for horn) <0 (off); 1 (on)>
  Z (for hazard lights) <0 (off); 1 (on)>

Sample Command Sequences:
- Turn high-beam headlights on
  *COS to BM:* H[0x02]
- Turn horn on
  *COS to BM:* N[0x01]
- Turn hazard lights off
  *COS to BM:* Z[0x00]
- Turn front wipers on as fast speed
  *COS to BM:* W[0x08]

FIGURE 13
BODY MODULE
DATA INTERFACE SPECIFICATIONS

DATA INTERFACE:
    <Car Operating System>----<Chassis Module>

Form of Communications:
- Communication between the Car Operating System (COS) and the Chassis Module (CM) uses USB serial communication through a serial port, such as COM5 (Windows) or /dev/TTYACM0.
- Communication is event-based, meaning that messages are sent when something changes rather than at regular intervals.
- Messages are two bytes (16 bits) long.

Notes on Communications:
- Messages should be sent in two-byte chunks so that they do not clump together. Otherwise, some messages may become mixed up in order and ignored.

Form of Commands:
- Each command is two bytes in the form of:
  1) one-byte ASCII/Unicode character that tells what the command is
  2) one-byte integer that gives the data associated with the command Implemented Commands:
- Normal form of commands:

A (for left front wheel) <number in range 0 to 255 with 0 for no stiffness and 255 for full stiffness>
  B (for right front wheel) <number in range 0 to 255 with 0 for no stiffness and 255 for full stiffness>
  C (for left rear wheel) <number in range 0 to 255 with 0 for no stiffness and 255 for full stiffness>
  D (for right front wheel) <number in range 0 to 255 with 0 for no stiffness and 255 for full stiffness>

Sample Command Sequences:
- Turn the suspension for the left front wheel to no stiffness
  *COS to CM:* A[0x00]
- Turn the suspension for the right front wheel to full stiffness
  *COS to CM:* B[0xFF]
- Turn the suspension for the left rear wheel to halfway between no and full stiffness
  *COS to CM:* C[0x7F]

FIGURE 14
CHASSIS MODULE
DATA INTERFACE SPECIFICATIONS

CAR OPERATING SYSTEM THAT CONTROLS THE CAR'S DIRECTION AND SPEED

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We gave the patent office as a text file a computer code listing for an example car operating system. That code listing contains the 18,481-byte ASCII file "CarOSnew.txt" that was created on Apr. 13, 2016. The CarOSnew.txt file contains Python code that will run on a Linux or Windows computer.

That code listing is part of the disclosure of this invention. A copy of the code listing can be obtained from the patent office. Or contact either of us (the inventors) for a copy.

INTRODUCTION

Imagine your computer without an operating system.

That means your keyboard must be hardwired into your computer. Same with your mouse. Your monitor. Your hard disk drive. Your memory. Your power supply. Your case.

Every part of your computer must be picked during the design process to fit into your particular model of computer. The parts must be made to order, then permanently soldered, screwed and welded together in a factory to make your computer.

To repair a broken part, you must find and order the same exact part for your model of computer. Then, because all the parts are tightly coupled together, you must take your computer apart, unsolder old wires and solder in the new ones.

Or let's say you want to upgrade your computer hardware. Say you want to put in a new solid-state drive to replace your old hard drive. You can, but it's not easy. You must fit the new hardware into a system not designed for it.

And to handle your new hardware, you must rewrite your software. That's because all the software that runs your computer (and all the software that runs on your computer) must be custom written for your model of computer alone.

Sound unusual? It should. That's not how your computer works. Your computer is a lot more flexible than that. Your computer has an operating system that handles your hardware so you don't have to. Upgrades are easy. So is replacement of a failed part. They are meant to be that way.

But your car works differently. It works like a computer that has no operating system. Upgrades are almost impossible. Repairs are hard. There is no flexibility to change your car's hardware without changing the way the whole car works.

Systems theorist Russell Ackoff explained how this works by imagining trying to build the world's greatest car by using the world's greatest car parts. Say you pick the engine from a Ferrari, the brakes from a Porsche, the suspension from a BMW, and the body from a Volvo.

That collection of the world's greatest car parts would not be a great car. Not even close. It would be a pile of junk. Those parts do not go together—they were not designed to work that way. The performance of a system—its achievement of its aims—depends as much on the interactions among parts as on the parts themselves. A system is more than just a collection of parts.

Because of that, on a conventional car the parts are carefully designed to interact and work together. They must be, in order for the conventional car to work. With conventional cars, a part from one car rarely works in another car. Even if it does, you have a Frankenstein's monster of a car—more frightening than useful.

A car operating system lets a car work differently than conventional cars. A car operating system takes care of the interactions between the car's parts so you can combine parts from different cars to make a new car. The car operating system controls how the parts making up the car interact to do what the car's driver wants.

FIG. 3 shows how that works.

Of course, things are a not quite that simple. So we will discuss in detail below three questions:

What is a car operating system?
Why is a car operating system important?
How does a car operating system work?

What is a Car Operating System?

A car operating system does what its name suggests—it operates the car as a system. As noted above, a car is not just a collection of parts. Instead, it is a collection of parts designed to work together and operate as a system.

The driver interacts with the car through the operating system, but the driver does not even know that the operating system is there. The operating system coordinates, communicates with, and controls the other parts of the car to make the car do what its driver wants. But the operating system does not itself do anything mechanical to make the car move in the physical world.

Speaking metaphorically, a car operating system lets the car's brain interact with the rest of the car, controlling the drive train, steering, brakes, and other devices in the car (headlights, windshield wipers, air conditioning, door locks) like a human brain controls a human body.

More literally, a car operating system is a software and hardware system that manages a car's resources—especially those resources that make the car move in a particular direction at a particular speed—so that they carry out the wishes of the car's driver.

The car operating system does this by allowing the driver to express her, his or (in the case of a self-driving car) its wish at a high level of abstraction. The details of how the car is to carry out this wish are hidden in that abstraction. The car operating system then reduces that wish down to device-specific commands at a lower level of abstraction that requires more knowledge of actual implementation details.

Talking about abstractions is a little abstract. Let's take a concrete example.

Suppose you want to turn a light off. To do that, you flip a light switch. Flipping the switch stops the flow of electricity through the light, and the light turns off. You directly controlled the light by moving a physical switch. There's nothing abstract about it.

Now suppose that you want the light off, so you say to your spouse, "Turn off the light, please." The light goes off. In this case, you did not yourself flip the switch, but instead made a request, or "command," to get your spouse to flip the switch. You used an abstraction.

Your command is an abstraction because it took the form of words in the English language, which are related to the physical world but do not directly affect it. In order for your abstract command to have an effect, something has to take concrete action in the physical world.

A car operating system manages the car resources by first taking abstract commands from the driver and making those commands more device specific. The car operating system allows the car's driver to express his, her or its wishes in an abstract way that is not related to the particular hardware in the car.

The car operating system then translates those wishes into more concrete (at a lower level of abstraction) commands to specific car resources. That way, the driver does not need to worry about, or even know, how the driver's wishes are being carried out in the concrete physical world.

In general, a driver cares about where the car goes. Usually, that means two things: (1) what direction the car is going, and (2) at what speed. The car's driver does not care how those things are done, as long as they are done.

Specifically, the driver does not need to know whether the car has a gasoline engine or an electric motor, how many wheels are getting power, what angle the wheels are being steered at, or any of the other concrete resources that must be managed for the car to move at the desired speed in the desired direction.

Those implementation details can be hidden using abstraction. Abstraction enforces a clear separation between the abstract wish of the driver and the concrete details of how the wish is carried out.

By design, a car operating system is not limited to work only in a particular model of car. Instead, a car operating system has well-defined and publicly known interfaces to make it work in many different kinds of cars. In each car it performs the function of taking abstract commands from a driver and making the car's hardware carry out those commands.

Most computers have operating systems. But cars today do not have a car operating system that—similar to a computer operating system—manages the resources of the car by taking in abstract commands from the driver and translating those commands into less abstract commands to individual car resources.

Car resources can be of three basic types, which may be handled separately by the operating system:
1. Core Resources: the traction motors, steering gear and brakes that change the direction and speed of the car.
2. Other Driving-Related Resources: things like headlights, signal lights and windshield wipers that are related to driving but do not actually change the direction or speed of the car.
3. Comfort Resources: things like entertainment, communication, heating and cooling, and navigation devices that are not directly related to moving the car.

A car operating system manages the core resources of the car, but it may also manage other driving-related resources and comfort resources as well. The car operating system may also handle the communication between those resources.

Finally, one caution. We give below a more detailed description of an example car operating system. Here we simply sketch out the basic concept of what a car operating system is. What we say here should not be used to define the scope of our invention—that is the job of the claims. But this background may help understand the remaining sections of this patent.

Why is a Car Operating System Important?

To start, let's look back in time to when cars were more primitive, and the driver had to directly control devices in ways that modern drivers never do. An excerpt from the John Steinbeck 1952 book East of Eden illustrates how "hands-on" a Ford Model T used to be for the driver to even start:

"'Now you see that-there? That's the ignition key. When you turn that-there you're ready to go ahead. Now, you push this do-hickey to the left. That puts her on battery see, where it says Bat. That means 'battery' . . . .

"'No—wait. I got ahead of myself. First you got to retard the spark and advance the gas, else she'll kick your goddam arm off. This-here—see it?—this-here's the spark. You push it up—get it?—up. Clear up. And this-here's the gas—you push her down. . . . '

"'Now you ready? Spark retarded, gas advanced. Spark up, gas down. Now switch to battery—left, remember—left.' A buzzing like that of a gigantic bee sounded. 'Hear that? That's the contact in one of the coil boxes. If you don't get that, you got to adjust the points or maybe file them.' . . . .

"'Now this-here is the crank and—see this little wire sticking out of the radiator?—that's the choke. Now watch careful while I show you. You grab the crank like this and push till she catches. See how my thumb is turned down? If I grabbed her the other way with my thumb around her, and she was to kick, why, she'd knock my thumb off. Got it?' . . . .

"'Now,' he said, "look careful. I push in and bring her up until I got compression, and then, why, I pull out this wire and I bring her around careful to suck gas in. Hear that sucking sound? That's choke. But don't pull her too much or you'll flood her. Now, I let go the wire and I give her a hell of a spin, and as soon as she catches I run around and advance the spark and retard the gas and I reach over and throw the switch quick over to magneto—see where it says Mag?—and there you are.'"

In a Model T Ford, the driver had to know a lot about how the car's resources worked to even start the car, and the driver had to directly control those resources. An old-fashioned automobile that could be started only with a crank required a person to make a series of adjustments directly to the engine and other car parts.

In a modern car, of course, you need only turn a key and a system of electrical and mechanical devices does the rest. But these electrical and mechanical devices still operate only with the particular equipment in the car. There is no operating system that takes commands from the driver and sends less abstract commands to the car's hardware.

How exactly does our car operating system differ from the control systems of today's cars? How about conventional cars, with internal combustion engines? Or advanced cars like the Chevy Volt, with more than 100 microprocessors and over 10 million lines of computer code? (As shown in FIG. 2.) Or the Tesla Model S, an electric-only car with advanced computer control?

To answer that question, let us look back at the Ford Model T, and trace from there the evolution of car control. As noted above, the driver of a Model T had to directly operate—using mechanical controls like wheels, pedals, levers and knobs—the various machines that made up the car.

Then controls began to evolve. Brakes and steering became power brakes and power steering, so that the driver's control of the brakes and steering was amplified. Then antilock braking became common. More and more, cars became easier to control. To the driver, the car became simpler.

Today's cars seem to be moving to drive-by-wire systems, which are closer to what we have invented, but not the same.

Drive-by-wire systems have controls that are no longer purely mechanical connections, but instead are electrical. That gives the opportunity to have an operating system in the middle between the driver and the car's hardware, but today's drive-by-wire systems do not include such an operating system.

Why not? Operating systems for gasoline cars do not really make sense. Even if the controls are drive-by-wire, the whole control system is designed specifically for use on one particular car. Since the car will never change in its basic design, there's no need for an operating system that can handle different hardware. Control can be direct, without the overhead of handling abstractions.

Electric cars like the Tesla Model S are the same way. Even if you consider the Model S to have an operating system of sorts, it is a custom operating system made by Tesla (the car's maker), designed to run only on a Model S, and designed to run on no other car. And that's not our invention. Our invention would make no sense running on a Model S.

An operating system like ours does make sense on a modular car. A modular car consists of individually designed and constructed modules connected together through specified interfaces. One module, for example, might be an electrical power module, another a body module, another the chassis, and so on.

When cars are modular, they can have different hardware configurations and still run the same operating system. The operating system handles any configuration. Because all modules plug into a common operating system, they can be mixed and matched on an almost plug-and-play basis to build a car to fit every driver's desires.

This concept—a modular architecture for a product, with an operating system that always presents the same interface to the product's user-took the computer industry by storm. In fact, Apr. 7, 1964 is perhaps the most important date in the history of computing. IBM announced its IBM 360 series of computer on that date, and computing has never been the same.

Before that date, innovation in the computer industry was steady but slow. Since then, with the advent of modular computer systems, it has exploded. Just as a computer operating system and modular hardware changed the computer industry, making cars modular and using our car operating system in modular cars can ignite the carmaking industry.

That's the car operating system from a historical view. Let's look at it from a more functional view. In the modern computer (by contrast with cars), an operating system has developed to fill the role of go-between. On one end you have the computer's user who wants to be able to order up a piece of long division, say, simply by supplying two numbers to the machine and ordering it to divide them.

At the other end stands the actual computer, which for all its complexity is an idiot savant. It can perform only basic operations, and long division may not be one of them. The machine typically must be instructed to perform a sequence of several of its basic operations in order to accomplish a piece of long division.

Software—a series of what are known as programs—translates the computer user's wish into specific, functional commands for the machine. One of those programs, the operating system, is usually the only program from which hardware components and devices receive instructions.

All other programs sit on top of the operating system and interact with the hardware only through it. So the operating system takes abstract commands from the user, either directly or through an application program, and translates them to make specific devices take specific actions.

A car operating system does the same thing in a car, and that brings several advantages. Using a car operating system can:

simplify the design of the car considerably enable different car part makers to specialize in different technologies, yet still participate directly in the market (rather than only through a carmaker)

support the portability of car resources

Another big advantage of a car operating system is the ability to add new modules and functions to a car as "plug and play" functions rather than having to redesign and re-integrate the car.

For example, suppose a car owner wanted to add a new collision avoidance system to his or her car. With a car operating system, the maker of the collision avoidance system could provide everything necessary to plug the system into any car, and have it work immediately. Just like plug-and-play works with computers using Windows.

Indeed, as we mentioned above, the computer industry changed dramatically as computers became modular. IBM's System 360 was extremely successful in the market, allowing customers to purchase a smaller system with the knowledge they would always be able to migrate upward if their needs grew, without reprogramming of application software or replacing peripheral devices.

The same thing can happen with cars. Now when you buy a car you are stuck with it until you junk it or sell it. You cannot upgrade it. If your car were modular and had a car operating system, you could buy a car knowing that you could change it as technology improved or your needs or wants changed.

Finally, using a car operating system can change a lot about how cars work, and how cars are made. Car technology can evolve more quickly. And the car industry can become more vibrant—filled with creative destruction where stagnating companies die out and growing companies replace them.

How does a Car Operating System Work?

A car operating system includes computer software and hardware. The car operating system takes the driver's abstract command, such as for direction and speed, and translates it to less abstract commands to car resources. In this example, to do that, the car operating system does two things:

1. Creates and maintains a map of car resources (as shown in FIG. 5).
2. Accepts a stream of abstract commands from the car's driver and translates them into less abstract commands to car resources (as shown in FIG. 7).

In this example, we discuss how a car operating system manages the resources of the car that relate to driving. That is, the core resources of the car (the traction motors, steering gear and brakes that change the direction and speed of the car) and the other driving-related resources (things like headlights, signal lights and windshield wipers that are related to driving but do not actually change the direction or speed of the car).

The part of the car operating system that controls the core speed and direction resources of the car is like the kernel of a computer operating system. The other parts of the car operating system can malfunction and the car can still go. Without the core resources, the car does not go.

In this example, we will not discuss the comfort resources of the car (things like entertainment, communication, heating and cooling, and navigation devices that are not directly related to moving the car). That is because they are the easiest for the car operating system to manage, and can be handled much like the other driving-related resources.

If desired, different software and hardware can handle core resources, other driving-related resources, and comfort resources. That may allow for greater security related to core resources, and greater flexibility for comfort resources. In this example, we have combined all the code into one computer program running on one computer.

The software code for this detailed example of a car operating system is in our code listing filed with the patent office. The car operating system is written in Python, and can run on any Windows or Linux computer that has a Python interpreter, an Internet connection, and USB ports connected to two Arduino Uno microcontrollers. The software code and the computer together make up the car operating system.

To try the software code out, you will need two other things. First, a program that translates movement by a driver of a joystick or other controller into commands that the car operating system understands, and sends over the Internet to the correct socket of the computer. Second, a car for the driver to drive. Since there are currently no real cars built to run our car operating system, we have built a small test-bed car. A car simulator can also be used.

The Car Resource Map

In this example, the car operating system builds and maintains a car resource map. This is a map of the available resources in the car, their current status, how they are called for by the driver, and how they are commanded by the car operating system.

The car resource map can be maintained in different ways. In this example, we set up the device values in the car resource map with the codes shown in FIG. 10A. The car operating system changes the variables listed so that the value for a device name contains the current state of the device. For example, if the left turn signals are turned on, the value of the variable TURN_SIGNAL changes from 'OFF' to 'LEFT' (FIG. 5).

In this example, changes to the car resources available to the car must be hardcoded as device names in the resource map. The program must also be changed when new devices are added or when old devices are dropped to reflect the interface specifications for the new device (FIG. 6).

The Command Parser

When the car operating system receives a command, the first thing it does is to see which command it received (FIG. 4). This is done by parsing the command, first getting the command word and then getting the command value, if any.

Let's take an example. Say the car operating system gets the following command from the driver control unit: "STEERING<0x03>-127<0x04>" First it gets the command word from the command, which is "STEERING". The hexadecimal 03 acts as a delimiter, setting off the command word.

Once the parser finds the STEERING command word, it passes off the rest of the command to a STEERING command handler routine. There the value in the command is peeled off (using the hexadecimal 04 as a delimiter) and turned into an integer.

Once the STEERING command and the 120 value have been interpreted, the command parser's work is done. Then control is turned over to the STEERING command handler routine to prepare and send commands to the actual motors that will move the car forward.

Command Handlers

Each command needs its own handler routine. That command handler can turn the abstract command received from the driver control unit into less abstract commands to the devices needed to carry out that command. Here again, an example may help explain.

Take steering as an example. FIG. 8A illustrates the steering system in a conventional car, where everything is mechanical. The driver turns the steering wheel, a gearbox pushes and pulls the wheels into the correct steering angle, and the car turns.

In contrast, FIG. 8B illustrates a steering system in a car with a car operating system. Let's trace the path of a steering command STEERING −127 in our example. First, the driver control unit sends over a network socket the command STEERING<0x03>-127<0x04>. The car operating system parses that command, and sends it to the STEERING command handler routine, which turns the −127 value into an integer.

The STEERING command handler routine then calculates the appropriate steering angle for each of the car's steerable wheels. In this example, the car's two front wheels are steerable. But as with the differential, where each powered wheel would need a different speed command if the car were turning, with steering each wheel will need to turn at a different angle due to car physics.

In today's cars, this difference in wheel angle is hardwired into the car's design as the Ackermann angle. The two front wheels of the car are usually linked together by a linkage that creates a parallelogram geometry. That geometry, though an approximation of the ideal geometry, works well enough in most cases.

A car operating system can do things differently. In this example, the car operating system calculates the steering angle for each wheel by setting the steering angle for the inside wheel to the desired steering angle (in this case −127, or full left) and then calculates the steering angle for the outside wheel using this equation:

$$\text{steer}=\arctan(1/(1/\tan(\text{currentSteerAngle})+\text{Track}/\text{Wheelbase}))$$

While this equation will give what is called the Ackerman angle, other equations can be used, including an equation that can use the car's speed as a parameter. This is important since the Ackermann angle is not always best for steering. Some race cars, for example, have reverse Ackermann steering, where the outside wheel in a turn is at a sharper angle than the inside wheel.

Returning to our STEERING −127 example, the steering for the left front wheel will be sent a signal to turn to position −127 (a full left turn of 30 degrees) and the right front wheel a signal to turn to position −93 (a left turn of about 22 degrees), assuming the track-over-wheelbase ratio to be 0.6.

In this example, the car operating system generates a command for the left front wheel that is L<0x00> and the right rear wheel that is R<0x22>. The "L" and "R" stand for left and right wheel steering, and the value is a single-byte hexadecimal value for 0 and 34 (both the −127 and −93 values have been added to 127 to give a non-negative integer).

The car operating system sends those commands as serial signals over a USB cable to an Arduino microcontroller. The Arduino microcontroller then decodes the signals and actually controls the steering actuator for each wheel to make the wheel turn to the signaled position.

To sum up, the car's driver decides that he or she wants to turn a certain direction, and indicates that using a driver control unit. The driver control unit receives the driver's desired direction and converts that desire into the STEER- ING −127 command, which is an abstraction that has no meaning in the concrete world.

The car operating system then parses that abstract command and, with a command handler that uses knowledge of the devices available in the car and the physics of how those devices operates, converts it into the device-specific commands L<0x00> and R<0x22>. Those commands are still abstract, but at a lower level of abstraction closer to the real world.

Let's look at another example, using a FORWARD command. A conventional car has a linkage between a gas pedal and an engine throttle. If the car is turning, the outside wheel will need to travel farther than the inside wheel, so it will need to move at a faster speed. A differential handles that on today's conventional cars.

In our example operating system, by contrast, the car's driver decides that he or she wants to go forward at a certain speed, and indicates that using a driver control unit. It could be by pushing down on an accelerator pedal, pulling in an accelerator paddle, setting a cruise control, typing words on a keyboard, or could even generated by a computer in a self-driving car.

If the car is turning, the car operating system then calculates the difference in speed between the car's inside and outside wheels using these car parameters:
  desired speed for the car,
  track (the width between the right and left wheels),
  wheelbase (the length between the front and back wheels), and
  car's current turning angle.
With those parameters, the equation for the inside wheel's speed is:

$$speed = carSpeed/(1+(Track/Wheelbase)*tangent(currentSteerAngle))$$

In today's cars, a complicated differential gear system is needed to make sure the powered wheels can turn freely going around a turn. With a car operating system, all that is needed is one line of code to accomplish the same thing.

Of course, with each wheel being powered separately, as in this example, there is no need to power the wheels to try to make them turn at any particular speed. So for example, to improve car stability and handling, only the outside wheel might be powered going around a turn. Or the inside wheel might be braked slightly—given "negative torque"—to increase a yaw effect and thus move the car more rapidly through the turn.

The Physics Engine

In this example of a car operating system, we separate out the equations that depend on car characteristics—such as the differential propulsion and the Ackermann steering—into a separate code section called the physics engine. That makes it easier to modify the car operating system for different cars or upgraded cars, since the command handlers may not need to be changed, but only the physics engine.

CONCLUSION

We traced above the parsing and handling of two commands (STEERING and FORWARD) in this example of our car operating system. FIGS. 9A and 9B show how the handling of braking evolved from early cars to later cars to a car with a car operating system. Many other commands are also implemented in our computer code appendix.

The interface between the car operating system and the driver control unit, whereby the car operating system receives abstract commands, is shown in FIGS. 10A and 10B. The interfaces between the car operating system and other modules of the car, whereby the car operating system sends abstract (but less abstract) commands, are shown in FIGS. 11 to 14.

The command parser can recognize each of the commands listed in FIG. 10A, and since each command has its own command handler in the car operating system, can send the value accompanying the command to the command handler.

In this way, the car operating system can receive abstract commands from the car's driver and process them to send less-abstract commands to the devices that will carry out the driver's commands. That means that abstract commands can be used to drive a car in the desired direction at the desired speed in the real world.

To enable cars to be made up of parts from more than just one company, the interfaces between the driver and the car operating system, and the interfaces between the car operating system and the other modules of the car, must be made available to other companies. The interfaces can be made public, or they may be licensed for a fee.

DRAWINGS

FIG. 2 shows an advertisement for the prior art Chevy Volt's control system that has over 10 million lines of computer code.

FIG. 3 compares a hardwired computer to a computer with an operating system, and similarly, compares a conventional car to a car with a car operating system.

Figure 1:
FIG. 1 shows in a cartoon a prior art example of how an abstraction—the driver's feeling of guilt—might be used to control a car.
Figure 4:
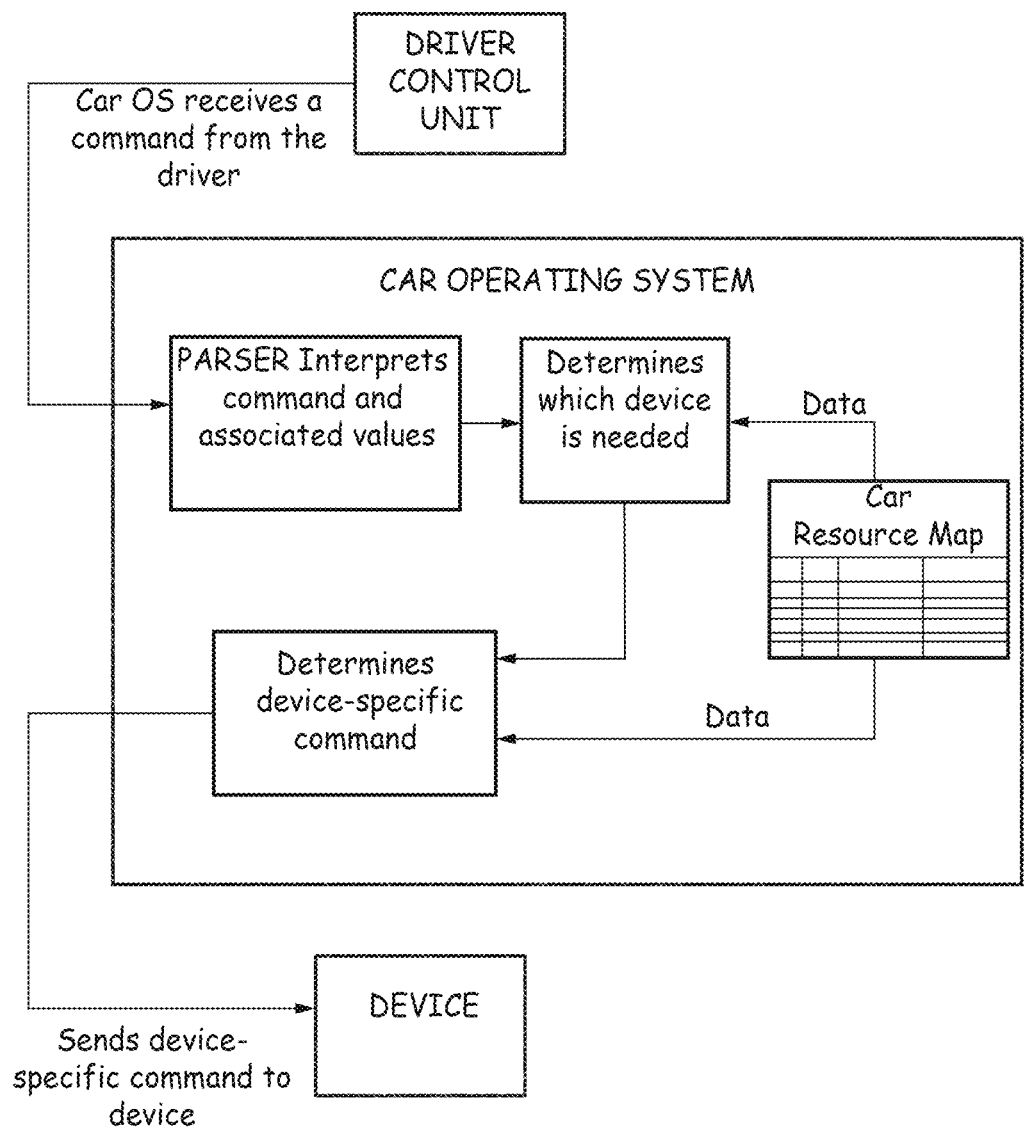

FIG. 4 shows a box diagram of an example of how a car operating system processes a command from a driver into a device-specific command that is at a lower level of abstraction.

FIG. 5 shows an example of a partial map of car devices.

FIG. 6 shows an example of maintaining a map of car devices.

Figure 7:
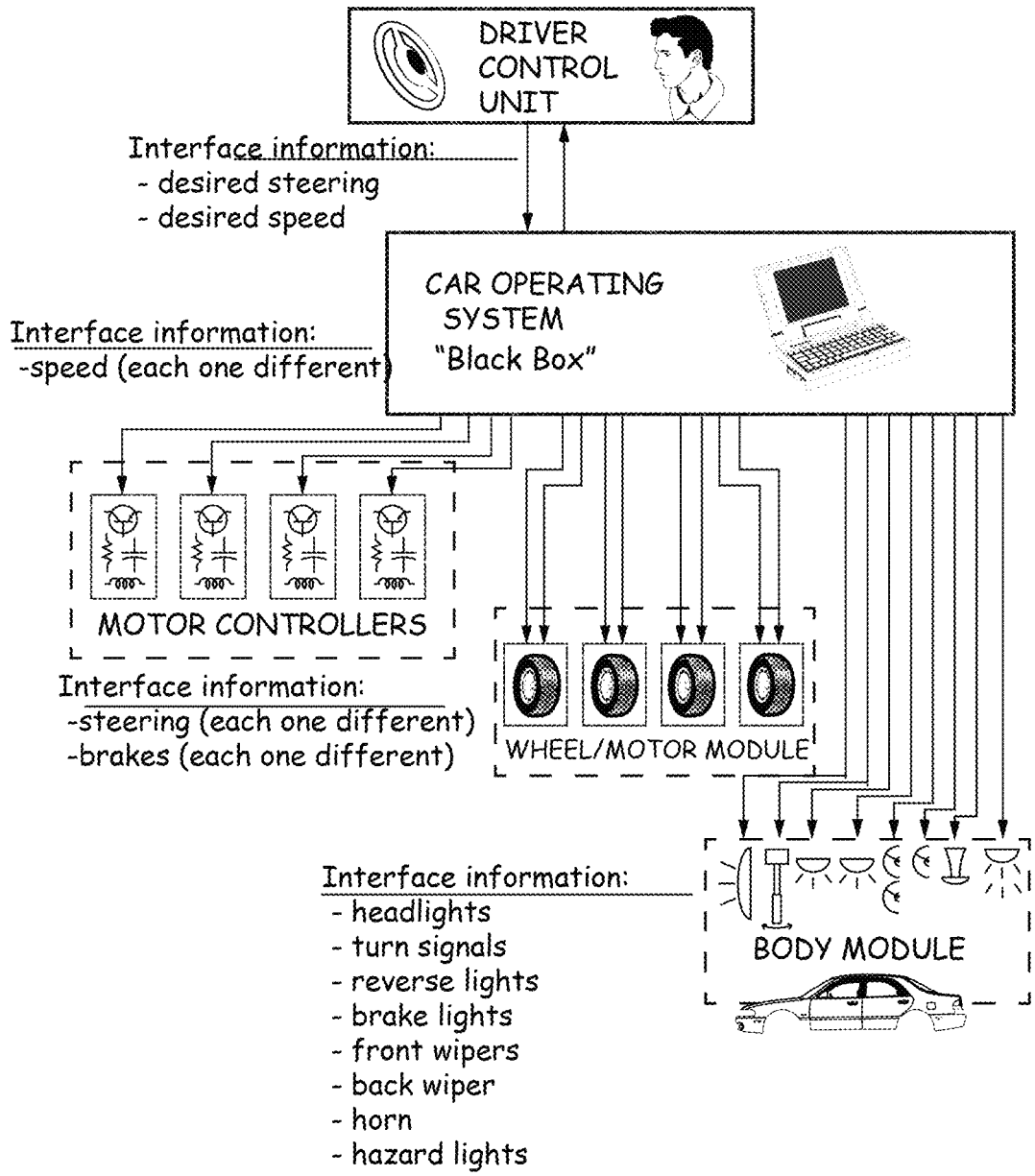

FIG. 7 shows the flow of control from the driver to the car devices.

Figure 8A:
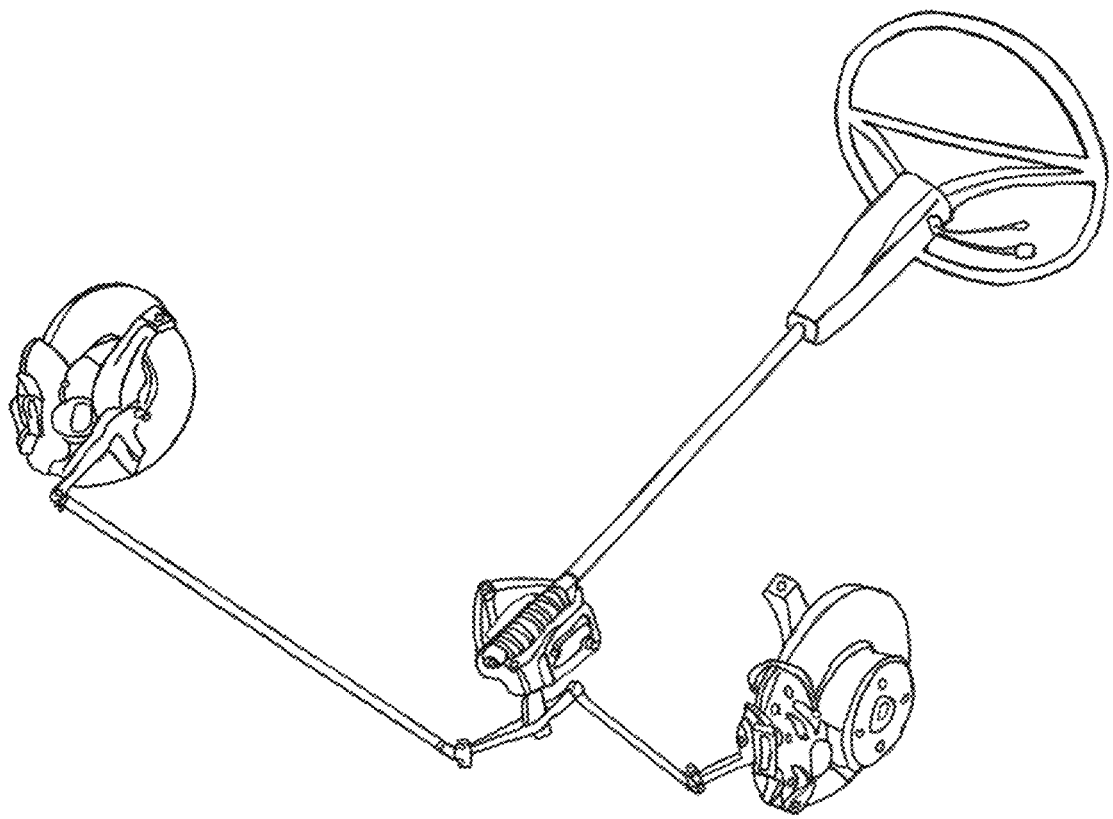

FIG. 8A shows how steering normally works in today's cars.

Figure 8B:
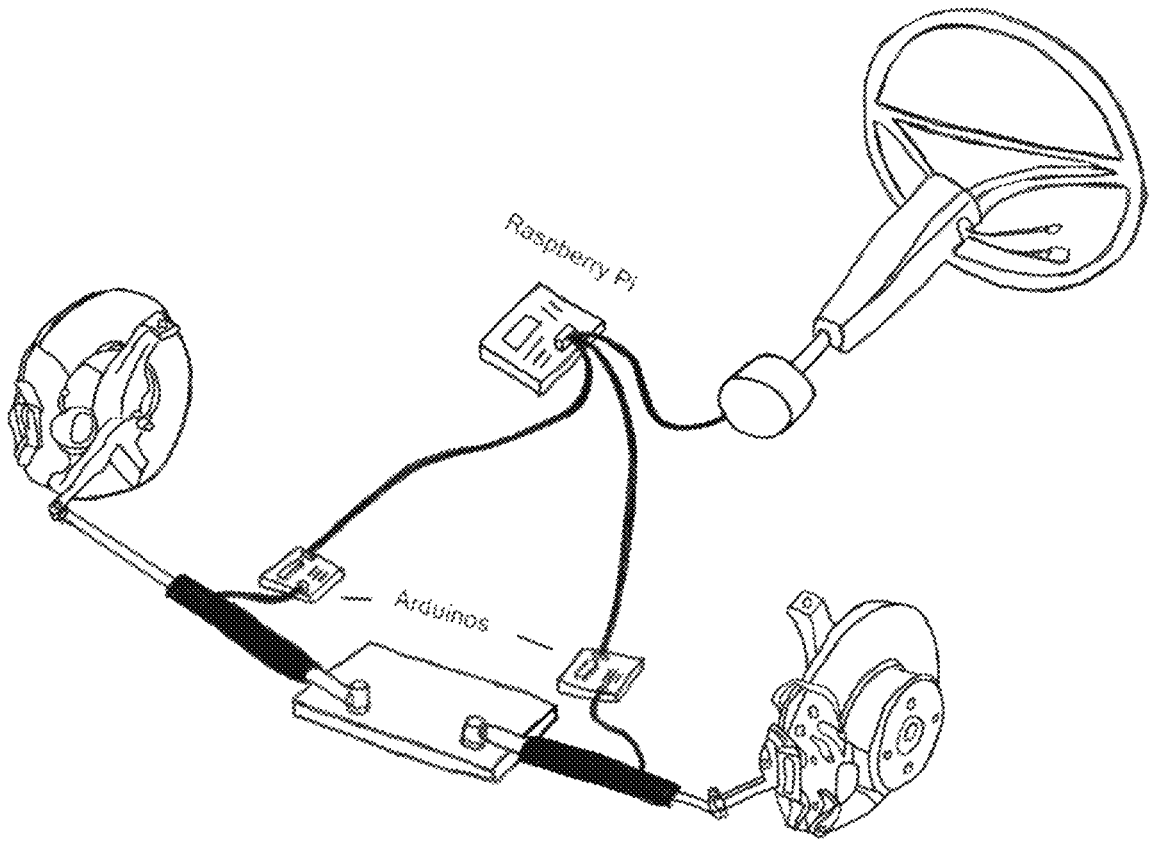

FIG. 8B shows an example of how steering might work with our car operating system.

FIGS. 9A and 9B show how the handling of braking evolved from early cars to later cars to a car with a car operating system.

FIG. 10A shows an example of car operating system specifications for exchanging data with a driver control unit.

FIG. 10B shows notes and examples on the car operating system data interface specifications.

FIG. 11 shows the data interface specifications between the motor controllers and the car operating system.

FIG. 12 shows the data interface specifications between the wheel/motor modules and the car operating system.

FIG. 13 shows the data interface specifications between the body module and the car operating system.

FIG. 14 shows the data interface specifications between the chassis module and the car operating system.

We claim:

1. A method for controlling the direction and speed of a car by interposing between the car and the car's driver a car operating system that includes a computer program running on a computer processor, where the car operating system is a separate and mobile device from the car, and establishing a first interface with a physical wired or wireless connection between the car's driver and the car operating system and a second interface with a physical wired or wireless connection between the car operating system and the car, whereupon the car operating system receives through the first interface a stream of digital electronic direction and speed commands from the car's driver and performs at least the following steps for each of the commands in the stream:

determine the meaning and any associated values of the command, translate the command from the language of the driver into the language of the car by selecting one or more steering, accelerating and/or braking devices available in the car and calculating a device-specific control signal for each of the selected devices, and send the one or more device-specific control signals through the second interface to the selected one or more devices of the car.

2. The method of claim 1 where the car has multiple kinds of steering, accelerating and/or braking devices available to carry out direction and speed commands.

3. The method of claim 1 where the computer program takes into account changes in the availability and configuration of the steering, accelerating and/or braking devices when it calculates the device-specific control signals for each of the one or more devices.

4. The method of claim 1 where the computer program coordinates multiple devices that provide the same steering, accelerating and/or braking function.

5. The method of claim 1 where the system allows steering, accelerating and/or braking devices to be replaced or added or removed, so that the devices perform different functions or the same functions implemented by different devices in a different way.

6. The method of claim 1 where a given digital command will be implemented with different control signals in different situations, depending on the status and availability of steering, accelerating and/or braking devices.

7. The method of claim 1 where the stream of digital commands comes from analog steering wheel and accelerator and brake pedal commands given by a human driver and turned into digital commands by a driver control unit.

8. The method of claim 1 where the stream of digital commands comes from a digital computer self-driving program.

9. The method of claim 1 where the car is an electric car with a modular architecture and the method coordinates modules of the car.

10. The method of claim 1 where:

(a) knowledge of the steering, accelerating and/or braking devices available in the car is obtained using a resource map of the available devices in the car, their current status, how they are called for, and how they are controlled by the system, (b) physics of how those devices operate is obtained using a physics engine that provides physical characteristics of the car related to the control of its direction and speed, and (c) a command handler is used to select one or more of the available devices and to calculate a control signal for each of the one or more available devices.

\* \* \* \* \*